US010549856B2

(12) United States Patent
Chouteau et al.

(10) Patent No.: US 10,549,856 B2
(45) Date of Patent: Feb. 4, 2020

(54) CONTROL DEVICE OF A COMMUNICATION SYSTEM OF AN AIRCRAFT

(71) Applicant: Airbus Operations SAS, Toulouse (FR)

(72) Inventors: Florient Chouteau, Toulouse (FR); Aymeric Perrin, Blagnac (FR); Christine Charbonnier, Saint Lys (FR); Jerome Gouillou, Colomiers (FR)

(73) Assignee: AIRBUS OPERATIONS SAS, Toulouse (FR)

(*) Notice: Subject to any disclaimer, the term of this patent is extended or adjusted under 35 U.S.C. 154(b) by 92 days.

(21) Appl. No.: 15/425,339

(22) Filed: Feb. 6, 2017

(65) Prior Publication Data
US 2017/0225786 A1 Aug. 10, 2017

(30) Foreign Application Priority Data

Feb. 10, 2016 (FR) ...................................... 16 51068

(51) Int. Cl.
G06F 3/0481 (2013.01)
G06F 3/0482 (2013.01)
(Continued)

(52) U.S. Cl.
CPC ........ B64D 11/0015 (2013.01); *G06F 3/0238* (2013.01); *G06F 3/04886* (2013.01);
(Continued)

(58) Field of Classification Search
CPC .... G06F 3/0481; G06F 3/0482; G06F 3/0483; G06F 9/4443; G06F 9/4448; G06F 3/165;
(Continued)

(56) References Cited

U.S. PATENT DOCUMENTS 6,104,926 A * 8/2000 Hogg ................. H04B 7/18506
340/5.1
6,112,141 A * 8/2000 Briffe ..................... G01C 23/00
345/1.3

(Continued)

FOREIGN PATENT DOCUMENTS

FR 2821468 8/2002
FR 2907996 5/2008

OTHER PUBLICATIONS

French Search Report, dated Sep. 28, 2016, priority document.

*Primary Examiner* — Arpan P. Savla
*Assistant Examiner* — Erik V Stitt
(74) *Attorney, Agent, or Firm* — Greer, Burns & Crain, Ltd.

(57) ABSTRACT

The control device of a communication system of an aircraft having a predefined number of communication channels comprises a processing unit and one or more sets of buttons each associated with a communication channel. The number of sets of buttons is less than the predefined number of communication channels of the communication system. The device comprises a set of call buttons comprising at least one transmission button, and a display area on a display screen, this display area being associated with the set of call buttons. The processing unit is configured to display an indication in the display area associated with the set of call buttons when the communication system receives a call on a channel with which no set of buttons is associated and to select this channel for transmission following an action of a user on the transmission button of the set of call buttons.

9 Claims, 8 Drawing Sheets

(51) Int. Cl.
    *B64D 11/00*    (2006.01)
    *G08G 5/00*     (2006.01)
    *H04W 84/06*    (2009.01)
    *G06F 3/023*    (2006.01)
    *G06F 3/0488*   (2013.01)
    *G06F 3/16*     (2006.01)
    *H04R 27/00*    (2006.01)

(52) U.S. Cl.
    CPC ............ *G06F 3/165* (2013.01); *G08G 5/0013* (2013.01); *G08G 5/0021* (2013.01); *H04R 27/00* (2013.01); *H04W 84/06* (2013.01)

(58) Field of Classification Search
    CPC ............ G06F 3/04886; H04N 5/44543; G06Q 10/109; B60K 35/00; B60K 2350/1064; G01D 7/04; B64D 11/0015; H04R 27/00
    See application file for complete search history.

(56) References Cited

U.S. PATENT DOCUMENTS

| | | | | |
|---|---|---|---|---|
| 6,473,675 B2 * | 10/2002 | Sample | ............... | G01S 1/045 |
| | | | | 701/14 |
| 6,559,753 B1 * | 5/2003 | Uchida | ............... | H04H 20/59 |
| | | | | 340/7.59 |
| 6,696,980 B1 * | 2/2004 | Langner | ............... | G01C 23/00 |
| | | | | 340/971 |
| 6,842,122 B1 * | 1/2005 | Langner | ............... | G01C 23/005 |
| | | | | 340/945 |
| 7,165,213 B1 * | 1/2007 | Busey | ............... | H04L 12/1813 |
| | | | | 709/202 |
| 7,460,029 B2 * | 12/2008 | Boorman | ............... | G01C 23/00 |
| | | | | 340/975 |
| 7,970,502 B2 * | 6/2011 | Boorman | ............... | G01C 23/00 |
| | | | | 244/175 |
| 9,703,476 B1 * | 7/2017 | Pappas | ............... | G06F 3/04847 |
| 2002/0119758 A1 * | 8/2002 | Gouillou | ............... | G08G 5/0008 |
| | | | | 455/74 |
| 2002/0119759 A1 | 8/2002 | Gouillou | | |
| 2003/0016632 A1 * | 1/2003 | Refai | ............... | H04M 3/56 |
| | | | | 370/260 |
| 2003/0025719 A1 * | 2/2003 | Palmer | ............... | G01C 23/005 |
| | | | | 715/700 |
| 2003/0125076 A1 * | 7/2003 | Seppala | ............... | H03J 1/0075 |
| | | | | 455/556.1 |
| 2006/0286961 A1 * | 12/2006 | Levitan | ............... | G01S 5/0081 |
| | | | | 455/404.2 |
| 2008/0305762 A1 * | 12/2008 | Malosh | ............... | H04B 7/18506 |
| | | | | 455/404.1 |
| 2009/0017777 A1 * | 1/2009 | Malaga | ............... | H04B 1/406 |
| | | | | 455/90.2 |
| 2009/0262661 A1 * | 10/2009 | Ueda | ............... | H04N 1/00291 |
| | | | | 370/254 |
| 2010/0094484 A1 | 4/2010 | Cornell et al. | | |
| 2016/0196752 A1 * | 7/2016 | Ihns | ............... | G08G 5/0021 |
| | | | | 345/157 |
| 2016/0202950 A1 * | 7/2016 | Hawley | ............... | G06F 16/683 |
| | | | | 700/94 |
| 2017/0017463 A1 * | 1/2017 | Zhou | ............... | G06F 3/167 |

\* cited by examiner

CONTROL DEVICE OF A COMMUNICATION SYSTEM OF AN AIRCRAFT

CROSS-REFERENCES TO RELATED APPLICATIONS

This application claims the benefit of the French patent application No. 1651068 filed on Feb. 10, 2016, the entire disclosures of which are incorporated herein by way of reference.

BACKGROUND OF THE INVENTION

The present invention relates to a control device of a communication system of an aircraft, notably a transport airplane. In the context of the present invention, a communication system is understood to be a set of standard communication equipment items, making it possible to implement and control audio communications on board the aircraft. These audio communications are, in particular, all those that the pilots of the aircraft can have, notably with air traffic control (via VHF channels or HF channels for example), with the airlines (via VHF channels or even a channel corresponding to a telephone link, for example over the "SATCOM" network), with the crew in the passenger cabin of the aircraft (via a channel corresponding to a cabin intercom), with the passengers (via a channel corresponding to a public address link, between pilots (via a cockpit intercommunication channel), etc.

To control such a communication system (that is to say all the communication equipment items), the pilots generally use a standard device of ACP (Audio Control Panel) type. The device of ACP type comprises a set of buttons for each communication channel of the controlled communication system. This set of buttons includes a button for setting sound volume (generally a rotary knob), a listening button making it possible to select or deselect listening to the corresponding communication channel and a transmission button making it possible to select or deselect the corresponding communication channel for transmission. This device of ACP type makes it possible to mix several communication channels in reception: radio communication (VHF, HF, etc.), SATCOM telephone link, cabin intercom, etc. This mixing enables pilots to listen simultaneously to several channels, with the possibility of setting the sound volume of each of the channels by means of buttons for setting sound volume of the device of ACP type. The ACP device further allows a user, such as a pilot, to select a channel for transmission (one channel at a time).

The device of ACP type also allows the pilot to receive calls, in particular from a communication channel corresponding to a SATCOM telephone link, to the cabin intercom or to an intercom provided for a mechanic when the airplane is on the ground. For that, when a call is received over a communication channel, the device of ACP type signals this call, for example by displaying a "CALL" indication alongside a button corresponding to this communication channel and by activating a sound signal. The pilot can answer this call by actuating the transmission button corresponding to the communication channel concerned.

In addition to the device of ACP type, the pilot usually has a frequency setting device of RMP (Radio Management Panel) type, of RCP (Radio Control Panel) type or of RTP (Radio Tuning Panel) type, for setting the radio frequencies of VHF and HF radio communication channels. He or she can also manually select or set telephone numbers, via the SATCOM system for example, generally from a page that can be displayed on a device of MCDU (Multipurpose Control and Display Unit) type, or even from the frequency setting device.

The document FR2.821.468A1 describes a control device of a communication system incorporating the functionalities of a device of ACP type, of a device of RMP (or RCP or RTP) type, as well as telephone number selection or setting.

The device of ACP type, whether independent or incorporated in a control device such as that described in the document FR2.821.468A1, comprises a set of buttons for each communication channel of the communication system controlled, as indicated previously. In order to reduce the bulk, the weight and the cost of the buttons, it could be advantageous to provide a number of sets of buttons less than the number of communication channels of the communication system, these sets of buttons being able to be configured by the pilot to associate them with the different communication channels of the communication system. Thus, at a given instant, the pilot can use these sets of buttons to control the communication channels with which they are associated. If he or she has to control another communication channel, he or she can reconfigure a set of buttons to associate it with this communication channel. However, in the case where a call is received over a communication channel with which a set of buttons is not associated, the pilot cannot answer this call.

SUMMARY OF THE INVENTION

An aim of the present invention is notably to provide a solution to these problems. It relates to a control device of a communication system of an aircraft, the communication system having a predefined number of communication channels, the device comprising a processing unit, a display screen and one or more sets of buttons, each set of buttons being associated with a communication channel and comprising:
  a button for setting sound volume;
  a so-called reception button, provided for activating and/or deactivating listening to the channel associated with the set of buttons; and
  a so-called transmission button, provided for selecting and/or deselecting the channel associated with the set of buttons for transmission.
This device is noteworthy in that:
  the number of sets of buttons is less than the predefined number of communication channels of the communication system,
  the device further comprises:
    a set of so-called call buttons, this set of call buttons comprising at least one transmission button, and
    a display area on the display screen, this display area being associated with the set of call buttons and arranged facing the set of call buttons, and
  the processing unit is configured to display an indication in the display area associated with the set of call buttons when the communication system receives a call over a channel with which no set of buttons is associated and to select this channel for transmission following an action of a user on the transmission button of the set of call buttons.

Thus, when a call is received over a communication channel with which no set of buttons is associated, a user such as a pilot of the aircraft is informed of this call by virtue of the indication displayed in the display area associated with the set of call buttons and the user can answer this call by selecting this channel for transmission by means of the transmission button.

According to particular embodiments that can be taken into account in isolation or in combination:
- the processing unit is further configured to activate listening on the channel following the action of the user on the transmission button of the set of call buttons;
- the set of call buttons further comprises a button for setting sound volume;
- the transmission button of the set of call buttons corresponds to a touch-sensitive surface superimposed on the display area associated with the set of call buttons and the indication displayed by the processing unit in the display area associated with the set of call buttons, when the communication system receives a call on a channel with which no set of buttons is associated, comprises at least the name of the channel;
- the display area associated with the set of call buttons comprises several display subareas, the touch-sensitive surface comprises several touch-sensitive sub surfaces each superimposed on a display subarea and the processing unit is configured in such a way that, when the communication system receives simultaneous calls on several channels with which no set of buttons is associated, the processing unit controls the display of the names of the channels in distinct subareas of the display area and the processing unit activates a transmission on one channel out of the channels following an action of a user on the touch-sensitive subsurface superimposed on the display subarea in which the name of the channel is displayed;
- the processing unit is configured in such a way that when a user initiates a call on a communication channel with which no set of buttons is associated, the processing unit associates the set of call buttons with this communication channel The invention also relates to an aircraft comprising a control device of a communication system as mentioned above.

BRIEF DESCRIPTION OF THE DRAWINGS

The invention will be better understood on reading the following description and on studying the attached figures.

FIG. 1b is a detailed view of a part of FIG. 1a.

FIG. 2b is a detailed view of a part of FIG. 2a.

DETAILED DESCRIPTION OF THE PREFERRED EMBODIMENTS

Figure 10:
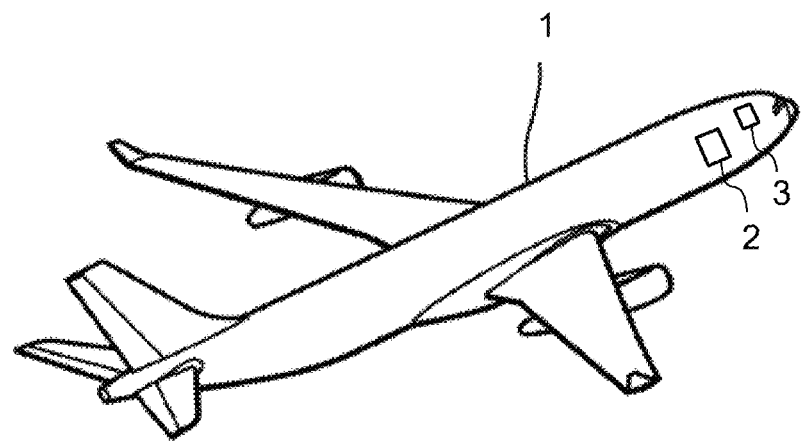
FIG. 10 represents an aircraft comprising a control device of a communication system.
Figure 11:
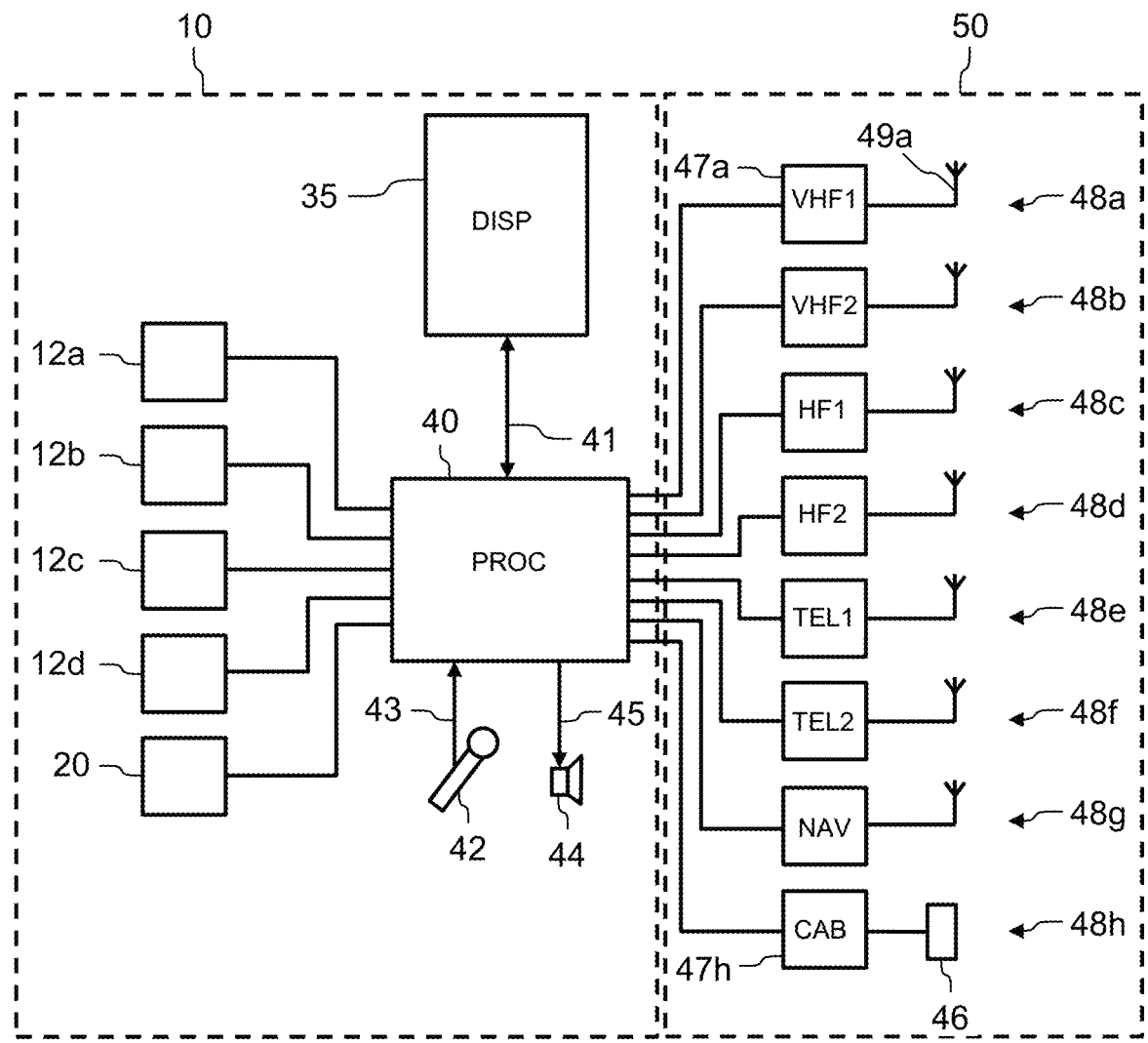
FIG. 11 schematically represents a control device of a communication system of an aircraft, linked to such a communication system.

In an aircraft, such as the aircraft 1 represented in FIG. 10, the control device 10 of a communication system 50 of the aircraft, represented in FIG. 11, comprises a processing unit 40 (denoted PROC in the figure), sets of buttons 12a, 12b, 12c and 12d linked to the processing unit 40, a display screen 35 (denoted DISP in the figure) linked to the processing unit by a link 41, a microphone 42 linked to the processing unit by a link 43 and a loudspeaker 44 linked to the processing unit by a link 45. Preferably, the processing unit 40 comprises a microprocessor or a microcontroller and at least one memory. The communication system 50 comprises a set of communication channels 48a, 48b . . . 48h. These communication channels respectively comprise standard communication or radio communication equipment items 47a . . . 47h. The radio communication equipment items are linked to one or more antennas of the aircraft. For example, the equipment item 47a of VHF type (denoted VHF1 in the figure) is linked to an antenna 49a of the aircraft. In the example represented in the figure, the equipment item 47h corresponds to an equipment item allowing communications with the passenger cabin. This equipment item (denoted CAB in the figure) is linked to an intercom 46 in the passenger cabin. The different communication and/or radio communication equipment items 47a . . . 47h can notably be placed in an avionics rack 2 of the aircraft. The control device 10 is preferably located in a cockpit 3 of the aircraft. In a particular embodiment, the loudspeaker 44 corresponds to a loudspeaker (or to a pair of loudspeakers) incorporated in an audio headset of a pilot. The microphone 42 is then also incorporated in this audio headset.

The sets of buttons 12a . . . 12d are reconfigurable, that is to say they are provided to be each associated with a communication channel of the communication system of the aircraft and a user can configure the association between each set of buttons and the communication channel associated with this set of buttons. Each of the sets of buttons 12a . . . 12d comprises a button for setting sound volume, respectively 14a . . . 14d and a reception button, respectively 15a . . . 15d. The reception button is provided to activate or deactivate listening to the communication channel with which the set of buttons to which it belongs is associated, by successive presses on this reception button. This reception button can be located on an end of the button for setting sound volume, which allows for a greater physical integration of the buttons and therefore a space saving. That also allows for a better ergonomy of use, in as much as the button for setting sound volume and the reception button of one and the same communication channel are located together. A display area, respectively 18a . . . 18d, defined on the display screen 35, is associated with each of the sets of buttons, respectively 12a . . . 12d. The display area associated with a set of buttons is arranged facing at least one button of the set of buttons and it is provided to display at least the name of the communication channel associated with the set of buttons.

Figure 1A:
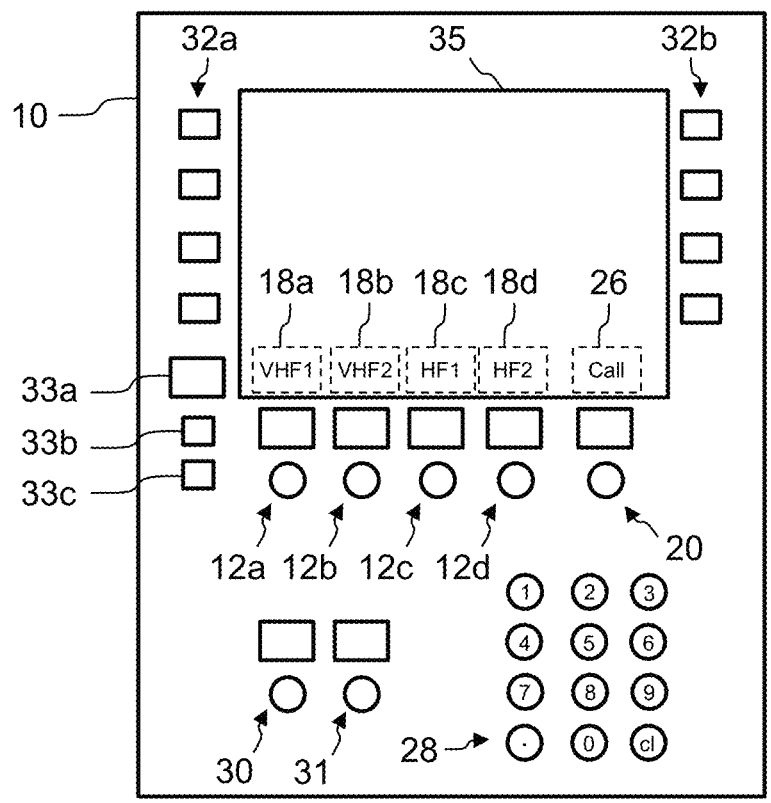
FIG. 1a illustrates a control device of a communication system of an aircraft, according to a first embodiment of the invention.
Figure 1B:
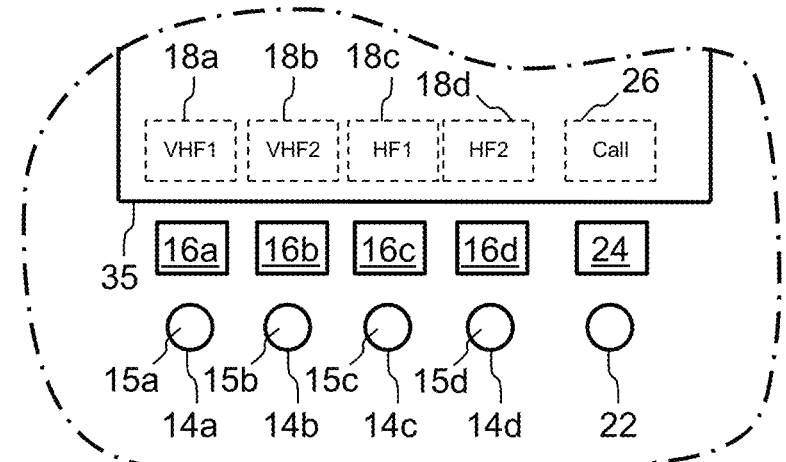

In a first embodiment represented in FIGS. 1a and 1b, each set of buttons 12a . . . 12b further comprises a transmission button, respectively 16a . . . 16d. This transmission button corresponds, for example, to an electromechanical button situated in proximity to the volume setting button. The transmission button is provided to select and/or deselect the communication channel associated with the set of buttons for transmission, just one communication channel being able to be active in transmission at a given instant. Preferably, although not necessarily, the display area 18a . . . 18d associated with a set of buttons 12a . . . 12d is situated facing the transmission button 16a . . . 16d of the set of buttons, as represented in FIG. 1b.

In operation, when a user such as a pilot of the aircraft performs an action on a button of one of the sets of buttons, the processing unit 40 conventionally accordingly controls the interactions between the microphone, the loudspeaker and the equipment items corresponding to the communication channel associated with this set of buttons. Thus, when the user presses on the reception button, the processing unit activates listening, on the loudspeaker 44, to the communication channel associated with the set of buttons. When the user presses the transmission button, the processing unit selects the communication channel associated with the set of buttons for transmission. If necessary, it deselects another communication channel previously selected for transmission, given that just one communication channel can be selected at a given instant for transmission. When a communication channel is selected for transmission, the processing unit allows the transmission of the signals from the microphone 42 to the equipment item 47a . . . 47h corresponding to the communication channel selected.

The processing unit 40 is further configured to configure the association between each of the sets of buttons 12a . . . 12d and the communication channel associated with this set of buttons, according to actions of a user on at least one interactive element of the device 10. In a particular embodiment, the interactive element corresponds to the transmission button 16a . . . 16d of the communication channel Advantageously, when a user presses for a long time (for example for longer than 2 seconds) on the transmission button of a set of buttons, the processing unit activates a configuration mode for the communication channel associated with the set of buttons. It then controls the display, on the display screen 35, of a menu or of a list allowing the user to choose the communication channel that he or she wants to associate with the set of buttons. In another particular embodiment, the device 10 comprises navigation keys 33a, 33b, 33c distinct from the sets of buttons and the interactive element corresponds to one of the keys, for example the key 33a. The processing unit is configured to commence configuration of the communication channel associated with a set of buttons when a user presses on this key. The processing unit is configured such that the user can then, initially, choose the set of buttons for which he or she wants to configure the associated communication channel (for example by means of the other navigation keys) and, secondly, choose the communication channel for example in a menu or in a list as described previously.

Once the communication channel is chosen by the user, the processing unit stores, in a memory, the association between the set of buttons concerned and this communication channel. The processing unit further controls the display, in the display area associated with the set of buttons, of the name of the communication channel, for example VHF1, VHF2, HF1, HF2, TEL1, TEL2, NAV or CAB.

According to a particular embodiment of the first embodiment, the control device 10 comprises sets of keys 32a, 32b situated in proximity to the display screen 35. These keys can, for example, be used conventionally to make choices in menus.

In another particular embodiment of the first embodiment, the control device 10 comprises sets of buttons 30, 31. Physically, these sets of buttons are similar to the sets of buttons 12a . . . 12d, but they are not reconfigurable: they are associated with communication channels, in a way that is preset and cannot be modified by a user. The communication channels with which these sets of non-reconfigurable buttons are associated correspond to communication channels over which a pilot of the aircraft needs to be able to interact rapidly at any instant, without requiring a reconfiguration of the association between a set of buttons and one of the channels. They can for example be channels corresponding to cockpit intercommunication between two pilots or to addressing the passengers (public address channel).

According to yet another particular embodiment of the first embodiment, the control device 10 comprises a keyboard 28. This keyboard makes it possible, for example, to enter numeric values, in particular for setting radio communication frequencies, for inputting telephone numbers, etc.

Figure 2A:
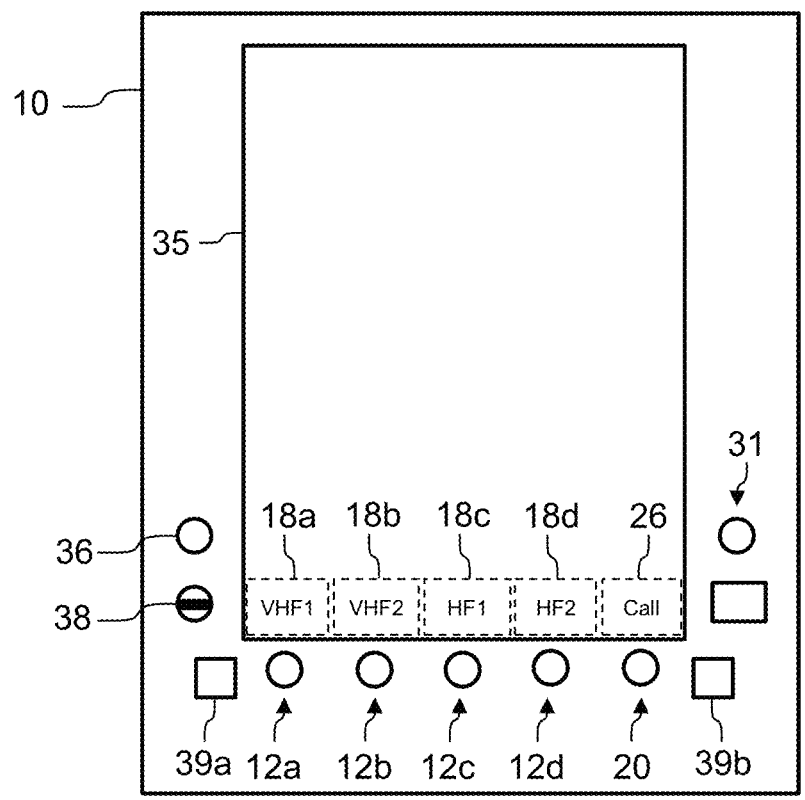
FIG. 2a illustrates a control device of a communication system of an aircraft, according to a second embodiment of the invention.
Figure 2B:
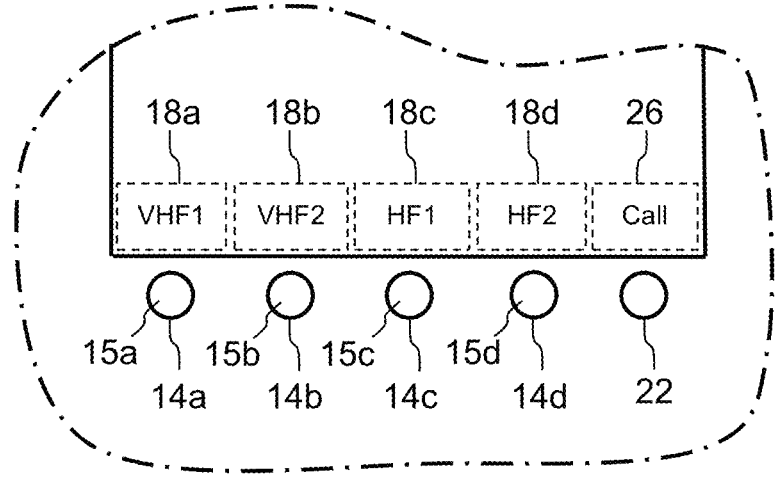

In a second embodiment represented in FIGS. 2a and 2b, the display screen 35 is a touch screen and the transmission button of the communication channel associated with each set of buttons 12a . . . 12b corresponds to a touch surface superimposed on the display area 18a . . . 18d associated with the set of buttons concerned. As in the first embodiment, the transmission button is provided to select and/or deselect the communication channel associated with the set of buttons for transmission, just one communication channel being able to be active in transmission at a given instant. Preferably, although not necessarily, the display area 18a . . . 18d associated with a set of buttons 12a . . . 12d is situated facing the volume setting button 14a . . . 14d of the set of buttons, as represented in FIG. 2b.

Figure 3A:
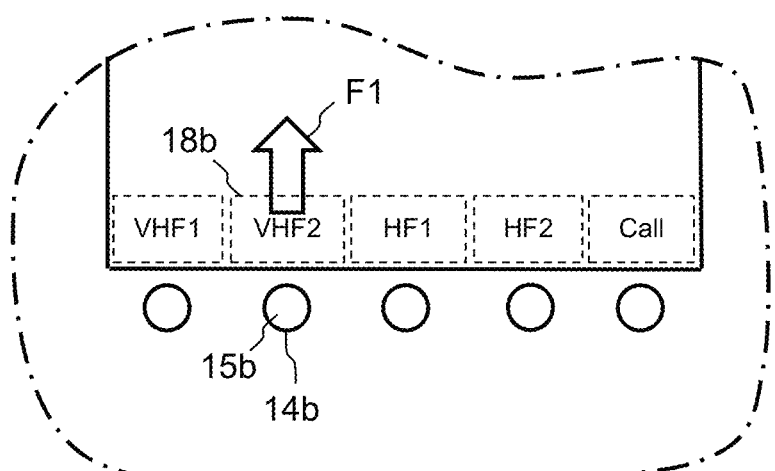
FIGS. 3a and 3b illustrate a particular way of producing the second embodiment of the invention.
Figure 3B:
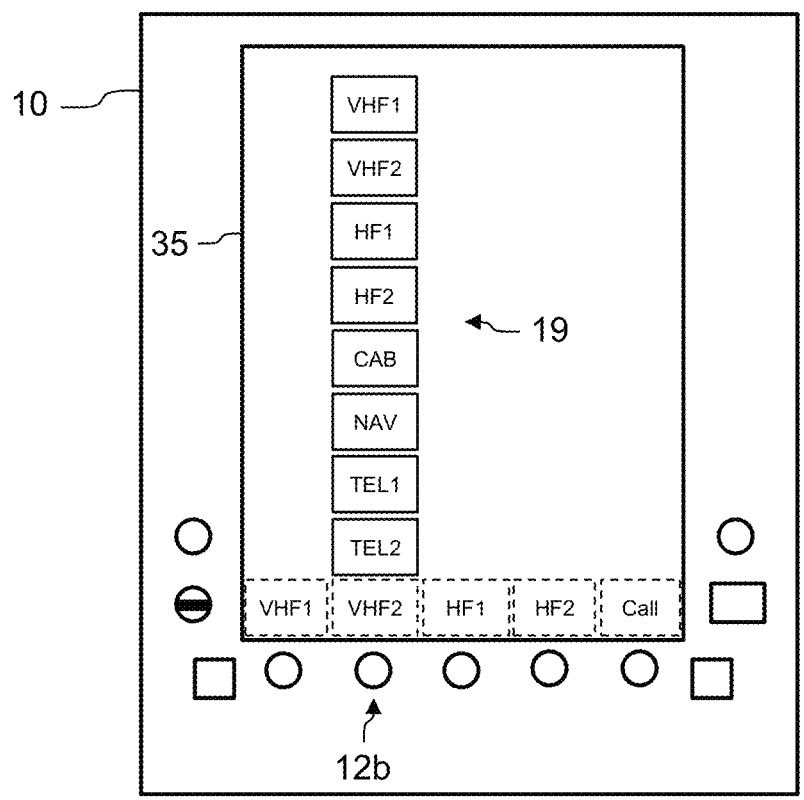

The processing unit 40 is configured to configure the communication channel associated with each set of buttons according to actions of a user on at least one interactive element of the device 10. In a particular manner, the interactive element corresponds to the transmission button of the communication channel, that is to say, to the touch surface superimposed on the display area associated with the set of buttons. Advantageously, when a user performs a specific gesture on this touch surface, the processing unit commences configuration of the communication channel associated with the set of buttons concerned by activating a configuration mode for the communication channel associated with the set of buttons. In a particular embodiment, this specific gesture corresponds to a prolonged press (for example for longer than 2 seconds) on the touch surface. In another particular embodiment, this specific gesture corresponds to the dragging of a finger of the user over the touch surface, as illustrated by the arrow F1 in FIG. 3a. After the gesture has been performed by the user, the processing unit 40 controls the display, on the display screen 35, of a menu or of a list allowing the user to choose the communication channel that he or she wants to associate with the set of buttons. FIG. 3b illustrates the display, on the display screen 35, of a list 19 of the different communication channels likely to be associated with the set of buttons 12b. Since the display screen 35 is a touch screen, the user can then choose a communication channel by touching an area of the display screen in which the name of the chosen communication channel is displayed. Once the communication channel is chosen by the user, the processing unit stores, in a memory, the association between the set of buttons concerned and this communication channel. The processing unit further controls the display, in the display area associated with the set of buttons, of the name of the communication channel, for example VHF1, VHF2, HF1, HF2, TEL1, TEL2, NAV or CAB.

According to a particular embodiment of the second embodiment, the control device 10 comprises sets of buttons 31 and (36, 38). These sets of buttons are not reconfigurable: they are associated with communication channels in a preset manner and cannot be modified by a user. The communication channels with which these sets of non-reconfigurable buttons are associated corresponds to communication channels over which a pilot of the aircraft needs to be able to interact rapidly at any instant, without requiring a reconfiguration of the association between a set of buttons and one of the channels. For example, the buttons 36 and 38 are associated with the communication channel corresponding to cockpit intercommunication between two pilots and the set of buttons 31 is associated with the communication channel corresponding to passenger address (public address channel).

According to another particular embodiment of the second embodiment, the control device 10 comprises keys 39a and 39b corresponding to particular functions of the device.

According to yet another particular embodiment, not represented, of the second embodiment, the various buttons of the sets of buttons 12a . . . 12b correspond to touch surfaces of the screen 35. The control device 10 can then have no electromechanical button.

Although illustrated in the particular case of the second embodiment, the rest of the description is not limited thereto and it applies equally to the case of the first embodiment.

Advantageously, the control device 10 is linked to a pointing device and the processing unit is configured to commence configuration of the communication channel associated with the set of buttons concerned when a user interacts with the display area 18a . . . 18d associated with the set of buttons 12a . . . 12d concerned by means of the pointing device. The pointing device corresponds for example to a device of "trackball" type of a human-machine interface of the cockpit of the aircraft, for example a human-machine interface of KCCU (Keyboard and Cursor Control Unit) type. Thus, for example, a user brings up on the display screen 35 a cursor associated with the pointing device. He or she moves this cursor over the display area associated with the set of buttons for which he or she wants to reconfigure the communication channel. When the cursor is on the display area, the user can then click by means of the pointing device. Since the latter is linked to the processing unit 40, the processing unit interprets this clicking action as a request from the user to commence configuration of the communication channel associated with the set of buttons concerned and it controls the display, on the display screen 35, of a menu or of a list in which or from which the user can choose a communication channel by means of the pointing device.

Figure 4:
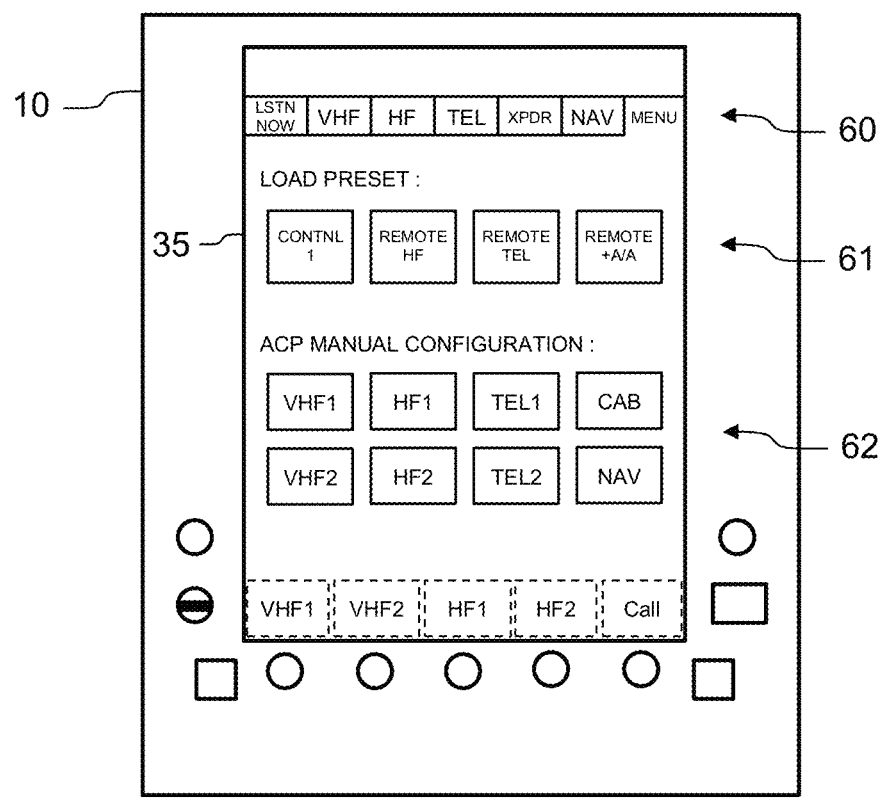
FIGS. 4, 5, 6, 7a, 7b, 8 and 9 illustrate particular embodiments of the invention.

Even more advantageously, the processing unit is configured to display, on the display screen 35, a so-called configuration menu, on request from a user, this configuration menu allowing the user to choose from several preset configurations of the channels associated with the various sets of buttons. In the example represented in FIG. 4, the screen 35 displays a list of tabs 60 in which the user can select a "Menu" tab. The tab can be selected by touch as the display screen is a touch screen. When the "Menu" tab is selected, the processing unit controls the display, on the display screen 35, of a list 61 of preset configurations (entitled "Load preset" in the figure) of the channels associated with the various sets of buttons. The list represented in the figure comprises four preset configurations entitled CONTNL1 (parameterized for continental overflight), REMOTE HF, REMOTE TEL (parameterized for ocean or desert area overflight, respectively prioritizing communications of HF type or of telephone by SATCOM type) and REMOTE+A/A (parameterized for so-called IFBP ("In Flight Broadcast Procedure") operations, simultaneously using one or more HF communication channels to communicate with air traffic control and several VHF channels to communicate respectively with air traffic control and with surrounding airplanes). The user can globally reconfigure the four sets of buttons 12a . . . 12d by choosing one of the preset configurations. In addition, in a particular embodiment, the processing unit controls the display, on the display screen 35, of a list 62 (entitled "ACP Manual configuration" in the figure) of communication channels, provided for a manual configuration of the communication channels associated with the sets of buttons 12a . . . 12d. In the case where the display screen 35 is a touch screen, the user can touch one of the items in the list 62 and drag it to one of the display areas 18a . . . 18d so as to associate the communication channel corresponding to this list item with the set of buttons with which the display area is associated. For example, the user can touch the "TEL1" item and drag it to the display area 18b. That causes the communication channel TEL1 to be associated with the set of buttons 12b, replacing the current communication channel VHF2. The processing unit stores this new configuration in a memory and it controls the display of "TEL1" in the display area 18b. The user can repeat such a procedure for each of the display areas 18a . . . 18d so as to quickly reconfigure all of the sets of buttons 12a . . . 12d from the "Menu" tab. When the display screen is not a touch screen, the user can move a list item 62 to a display area 18a . . . 18d by means of a pointing device, for example of "trackball" type. In another particular embodiment, the user can parameterize at least one of the preset configurations of the list 61 of preset configurations. For that, when the display screen is a touch screen, he or she for example performs a specific gesture on the display area corresponding to this preset configuration. The processing unit controls a display allowing the user to associate the communication channels from the list 62 with each of the sets of buttons 12a . . . 12d. When the user has associated the communication channels with each of the sets of buttons, the processing unit stores this preset configuration, and the latter can then be chosen by the user as indicated previously.

Figure 6:
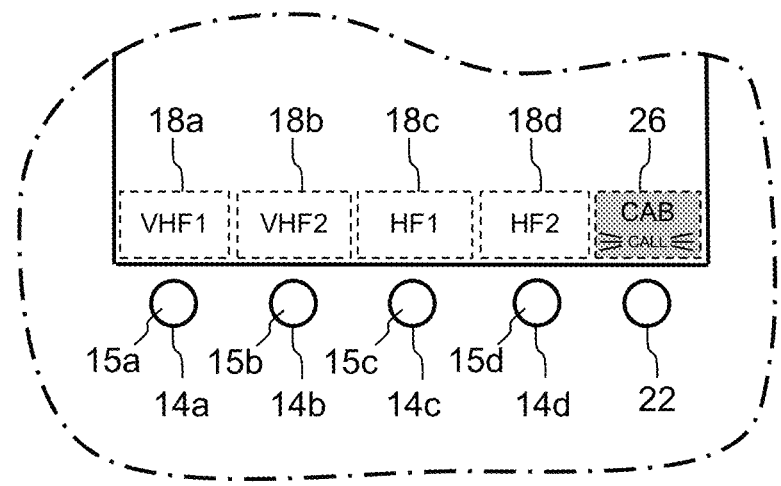
Figure 7A:
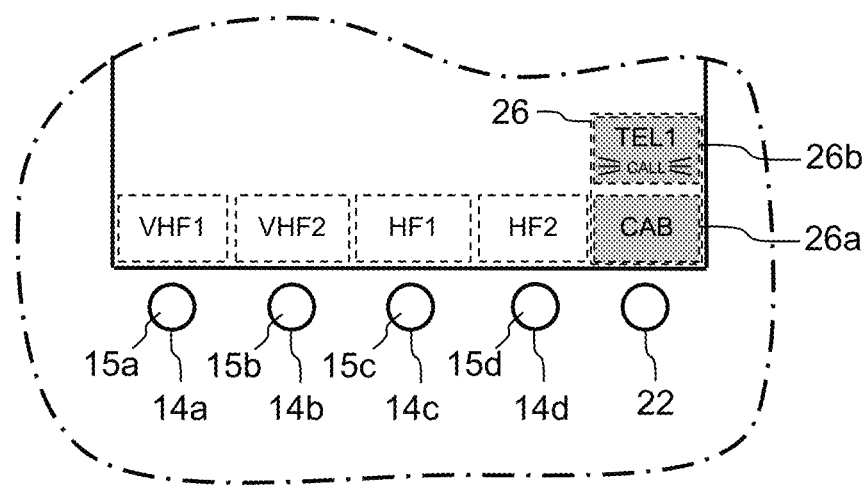
Figure 7B:
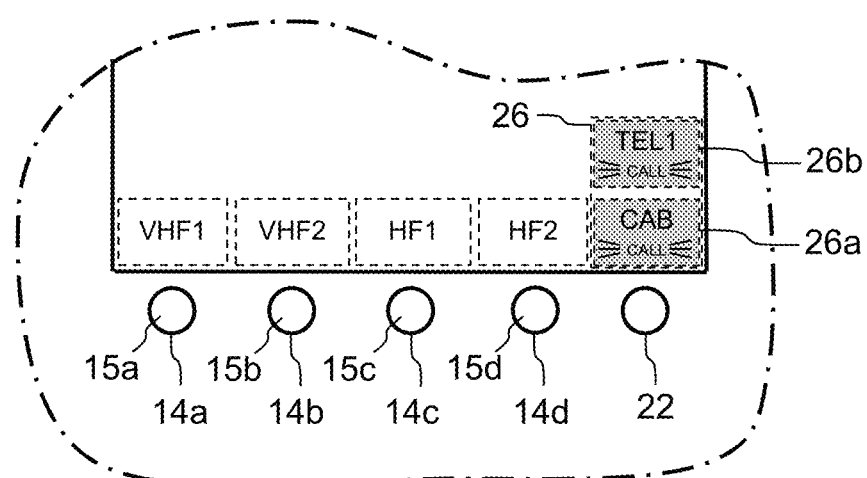

In an advantageous embodiment, the control device 10 comprises a set of buttons 20, called set of call buttons. This set of call buttons comprises at least one transmission button. The control device 10 further comprises a display area 26 on the display screen 35, this display area being associated with the set of call buttons and preferentially arranged facing the set of call buttons. The processing unit 40 is configured to display an indication in the display area associated with the set of call buttons when the communication system receives a call over a communication channel with which no set of buttons is associated and to select this communication channel for transmission following an action of a user on the transmission button of the set of call buttons. Upon the action on the transmission button, the processing unit further activates listening on the communication channel. According to a variant button embodiment represented in FIGS. 1a and 1b, the transmission button corresponds to an electromechanical knob 24. According to another variant embodiment represented in FIGS. 2a and 2b, the display screen 35 being a touch screen, the transmission button corresponds to a touch surface superimposed on the display area 26. Advantageously, the set of call buttons further comprises a button 22 for setting sound volume. FIG. 6 illustrates the reception of a call over the communication channel CAB, corresponding to the cabin intercom, in the case where none of the sets of reconfigurable buttons 12a . . . 12d is associated with this communication channel. Upon reception of the call, the processing unit controls the display, in the display area 26, on the one hand of the name of the communication channel, namely CAB, and on the other hand of a "CALL" indication to signal to a pilot that a call is received on this communication channel. Advantageously, the display of the "CALL" indication is a blinking display so as to more strongly attract the attention of the pilot. When the pilot presses on the transmission button (electromechanical button 24 or touch area superimposed on the display area 26), the processing unit 40 selects the communication channel CAB for transmission, which allows the pilot to answer the call, and the processing unit controls the stopping of the display of the "CALL" indication. If another communication channel was previously selected for transmission, the transmission over this other communication channel is deselected by the processing unit given that just one communication channel can be selected for transmission at a given instant. The pilot can stop the communication by pressing once again on the transmission button of the set of call buttons. Advantageously, the display area 26 associated with the set of call buttons 20 comprises several display subareas 26a, 26b as represented in FIGS. 7a and 7b and the touch surface comprises several touch sub surfaces each superimposed on a display subarea 26a, 26b. The processing unit 40 is configured in such a way that, when the communication system receives simultaneous calls over several channels with which no set of buttons is associated, the processing unit controls the display of the names of the channels in distinct subareas of the display area and the processing unit activates transmission on one communication channel out of the channels following an action of a user on the touch subsurface superimposed on the display subarea in which the name of the communication channel is displayed. In the example represented in FIGS. 7a and 7b, the communication system receives two simultaneous calls over the communication channels CAB and TEL1 with which none of the sets of buttons 12a . . . 12d is associated upon reception of the calls. More specifically, FIG. 7a represents a case in which the pilot has already answered a call over the communication channel CAB (as indicated previously) and a new call arrives over the channel TEL1. Before the arrival of the new call over the channel TEL1, the processing unit 40 controlled the display of the indication CAB in the display subarea 26a, without controlling a "CALL" indication in the display subarea since the pilot has already answered the call. On the arrival of the new call over the communication channel TEL1, the processing unit further controls the display, in the display subarea 26b, on the one hand of the TEL1 indication and on the other hand of the "CALL" indication to signal the new call over the communication channel TEL1. For its part, FIG. 7b represents a case in which the pilot has not yet answered one of the two calls. Consequently, the processing unit 40 controls the display of a "CALL" indication in each of the display subareas 26a and 26b.

Figure 5:
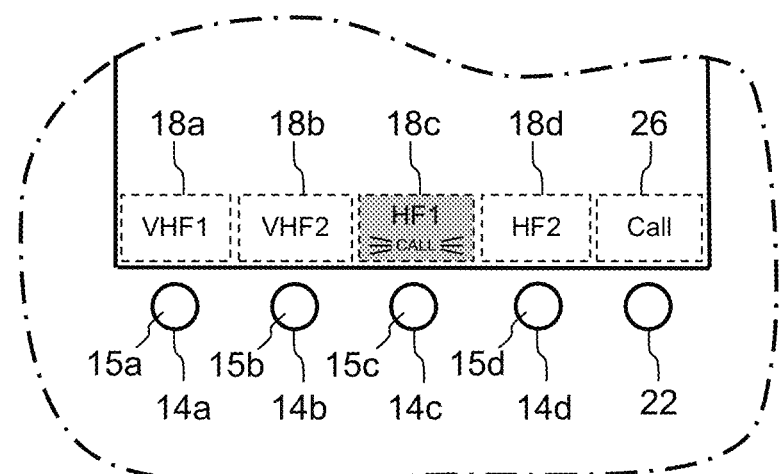

When a call is received by the communication system over a communication channel with which one of the sets of buttons 12a . . . 12d is already associated, the processing unit controls the display of a "CALL" indication in the display area 18a . . . 18d associated with this set of buttons. In the example illustrated by FIG. 5, the set of buttons 12c is associated with the communication channel HF1 and the processing unit controls the display of a "CALL" indication in the display area 18c associated with the set of buttons 12c to signal a call over this communication channel. The principle of operation is then similar to that already described for the set of call buttons.

In a variant embodiment, the processing unit is configured to display an indication in the display area 26 associated with the set of call buttons 20 when the communication system receives a call over any channel, even if a set of buttons 12a . . . 12d is already associated with this channel. This simplifies the ergonomy of use of the device by the pilot, since the latter can then always answer a call by performing an action on the transmission button 24 of the set of call buttons.

Figure 8:
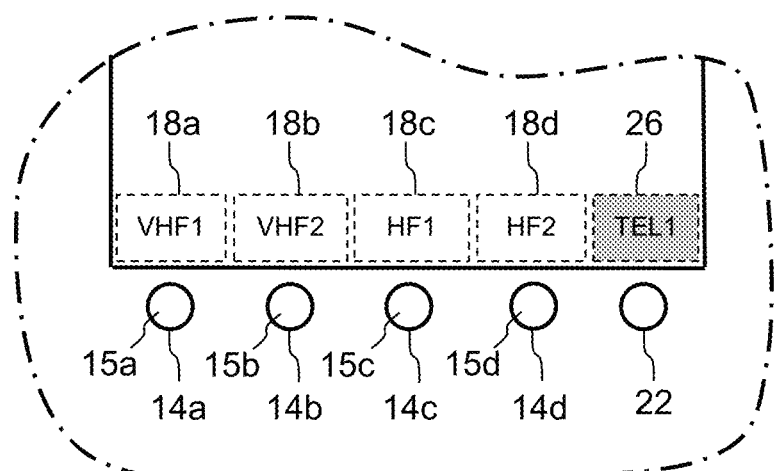

Advantageously, when a user, in particular a pilot, wants to transmit a call over a communication channel with which no communication channel is associated, this communication channel corresponding to a telephone link, the pilot sets the corresponding telephone number in an appropriate menu of the control device 10. This menu corresponds for example to the "TEL" tab of the list of tabs 60 represented in FIG. 4. When the pilot establishes a communication over this telephone link by means of the menu, the processing unit automatically associates the set of call buttons 20 with this communication channel and controls the display of the name of the communication channel (TEL1) in the display area 26 as represented in FIG. 8. The pilot can then set the sound volume in reception by means of the button 22 or even stop the communication by pressing on the transmission button of the set of call buttons, in the same way as if it were a received call.

Figure 9:
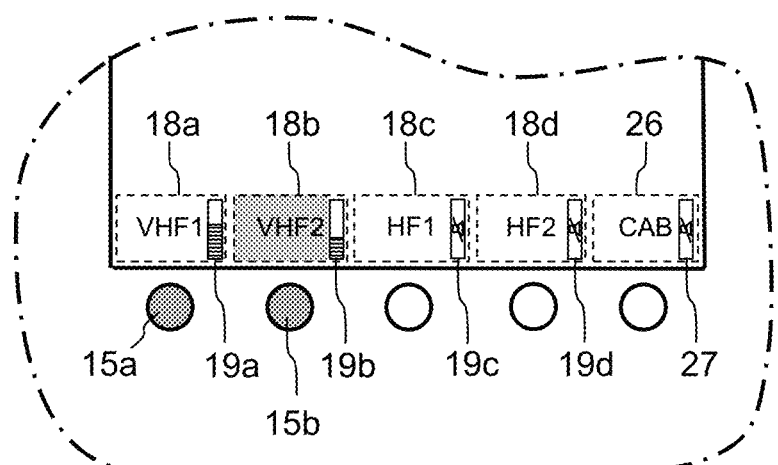

In a particular embodiment, the processing unit 40 further controls the display of a sound volume indicator 19a . . . 19d, or 27 in the display area associated with each set of buttons, as represented in FIG. 9. This sound volume indicator corresponds, for example, to a scale such as a barograph 19a, 19b displayed in proximity to an edge of the corresponding display area. When reception is not activated for a communication channel, the sound volume indicator can correspond to such a barograph displaying a zero value, or even a particular symbol 19c, 19d, 27 signaling that the reception is deactivated.

In another embodiment, that can be combined with the preceding one, a visual indicator is combined with the reception button 15a . . . 15d of each set of buttons. In the example represented in FIG. 9, the visual indicators combined with the reception buttons 15a and 15b are on to signal that the reception of the corresponding communication channels is activated.

Advantageously, when a communication channel is activated for transmission, the processing unit controls the display of a background of a specific color for the display area associated with the set of buttons associated with this communication channel. For example, the background of the display area is gray when the display area corresponds to a communication channel not activated for transmission and this background is green when the display area corresponds to a communication channel activated for transmission. Even more advantageously, the processing unit controls the display of a background of another specific color upon the reception of a call over a communication channel, in addition to the display of the "CALL" indication already mentioned.

The functionalities of the transmission, reception and sound volume setting buttons of each of the sets of buttons can be incorporated on one and the same control device without departing from the scope of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control device of a communication system of an aircraft, the communication system having at least first, second, third, and fourth predefined communication channels coupled to the control device, each of the first, second, third, and fourth predefined communication channels being a respectively different communication channel selected from the group consisting of a first communication channel, a second radio communication channel, a third radio communication channel, a first telephone link, a second telephone link, and a link to an intercom, the first, second, and third radio communication channels being linked to one or more antennas of the aircraft, the device comprising:
   a processing unit,
   a display screen,
   a first set of buttons having a predefined association by the processing unit with the first predefined communication channel, the first set of buttons comprising:
      a first physically activatable button for setting sound volume;
      a first physically activatable reception button, provided for at least one of activating or deactivating listening to the first predefined communication channel; and
      a first physically activatable transmission button, provided for at least one of selecting or deselecting the first predefined communication channel for transmission,
      a second set of buttons having a predefined association by the processing unit with the second predefined communication channel, the second set of buttons comprising:
   a second physically activatable button for setting sound volume;
   a second physically activatable reception button, provided for at least one of activating or deactivating listening to the second predefined communication channel; and
   a second physically activatable transmission button, provided for at least one of selecting or deselecting the second predefined communication channel for transmission,
   wherein said first set of buttons is selectively reconfigurable by the processing unit via a user interface to disassociate said first set of buttons with the first predefined communication channel and to associate said first set of buttons with one or more of the second, third, or fourth predefined communication channels,
   wherein said second set of buttons is selectively reconfigurable by the processing unit via the user interface to disassociate said second set of buttons with the second predefined communication channel and to associate said second set of buttons with one or more of the first, third, or fourth predefined communication channels,
   wherein the device further comprises:
      a set of call buttons not having a predefined association with any of the first, second, third, or fourth predefined communication channels, the set of call buttons comprising at least one physically activatable transmission button, and a display area on the display screen, the display area being associated with the set of call buttons and arranged facing the set of call buttons, and
   wherein, when the first set of buttons has a predefined association by the processing unit with the first predefined communication channel and the second set of buttons has a predefined association by the processing unit with the second predefined communication channel but the set of call buttons does not have a predefined association with any of the first, second, third, or fourth predefined communication channels, the processing unit is configured to display an indication in the display area associated with the set of call buttons when the communication system receives a call over either the third or the fourth predefined communication channel and to select this channel for transmission following an action of a user on the transmission button of the set of call buttons in response to said displaying of said indication.

2. The device as claimed in claim 1, wherein the processing unit is further configured to activate listening to said channel following said action of the user on the transmission button of the set of call buttons.

3. The device as claimed in claim 1, wherein the set of call buttons also comprises a physically activatable button for setting sound volume.

4. The device as claimed in claim 1, wherein the transmission button of the set of call buttons corresponds to a touch-sensitive surface superimposed on the display area associated with the set of call buttons and the indication displayed by the processing unit in the display area associated with the set of call buttons comprises at least the name of said third or fourth communication channel when the communication system receives a call on said third or fourth communication channel.

5. The device as claimed in claim 4, wherein the display area associated with the set of call buttons comprises several display subareas, the touch-sensitive surface comprises several touch-sensitive sub surfaces each superimposed on a display subarea and, the processing unit is configured in such a way that when the communication system receives simultaneous calls on the third and fourth communication channels, the processing unit controls the display of the names of said channels in distinct subareas of the display area and the processing unit activates a transmission on a channel out of said channels following an action of a user on the touch-sensitive subsurface superimposed on the display subarea in which the name of said channel is displayed.

6. The device as claimed in claim 1, wherein the processing unit is configured in such a way that when a user initiates a call on either the third or fourth communication channel, the processing unit in response to said initiating a call selectively associates the set of call buttons with this third or fourth communication channel.

7. The device as claimed in claim 1, wherein the processing unit is configured to display an indication in the display area associated with the set of call buttons when the communication system receives a call on any of the first, second, third, or fourth communication channels.

8. An aircraft comprising a control device of a communication system as claimed in claim 1.

9. The device as claimed in claim 1, wherein the predefined number of communication channels includes at least one communication channel corresponding to a telephone link;

wherein the device further comprises a user interface for selectively setting a telephone number to transmit a call over the telephone link.

* * * * *